UNITED STATES PATENT OFFICE.

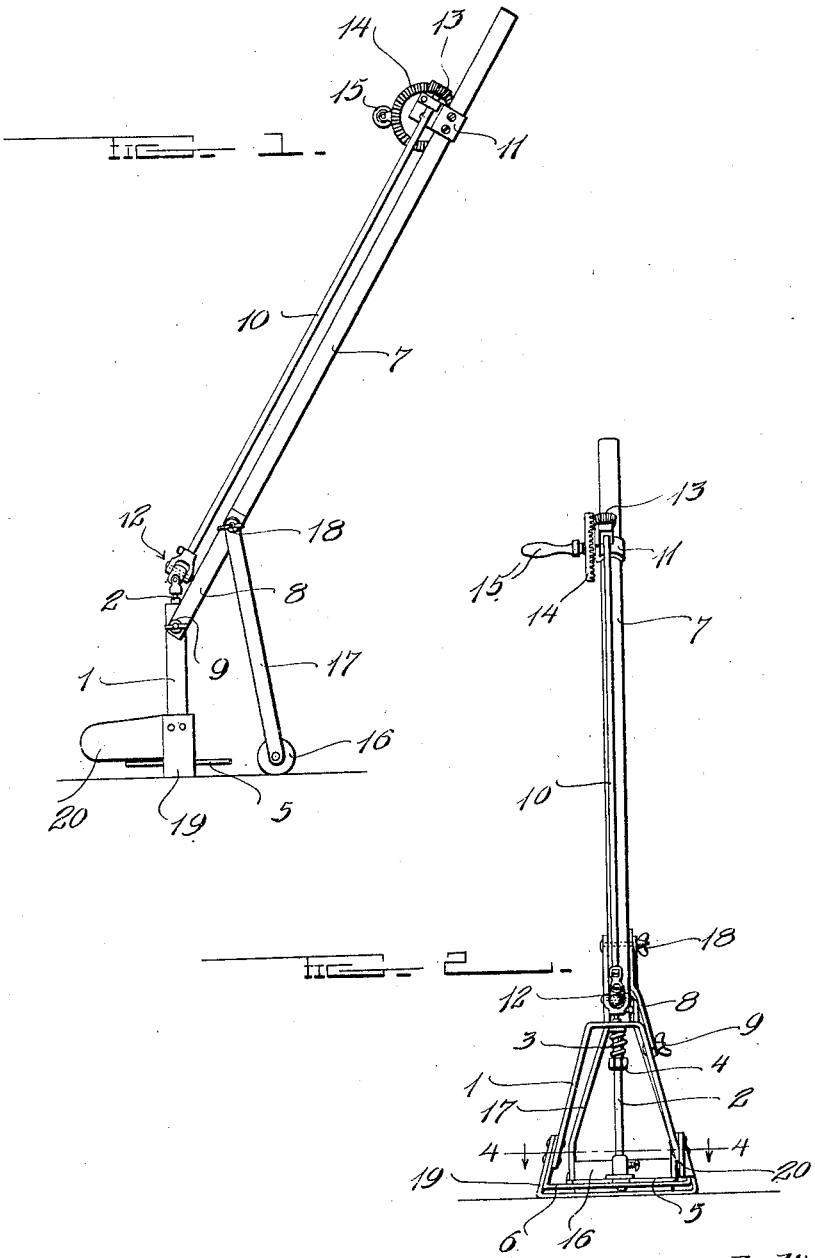

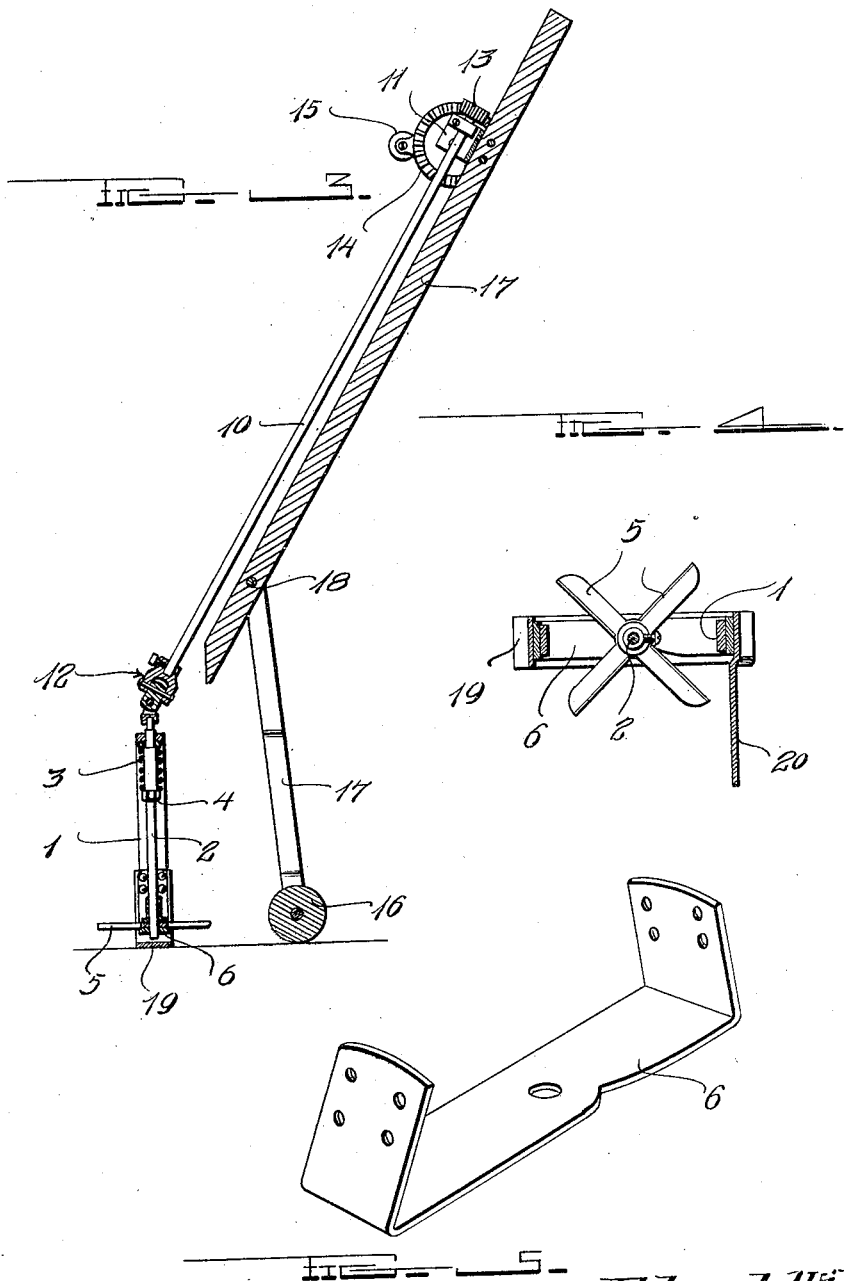

EDWARD WIKSTROM, OF LOWELL, MASSACHUSETTS.

GRASS-TRIMMER.

1,375,195.  Specification of Letters Patent.  Patented Apr. 19, 1921.

Application filed September 24, 1919. Serial No. 325,999.

*To all whom it may concern:*

Be it known that I, EDWARD WIKSTROM, a citizen of the United States, residing at Lowell, in the county of Middlesex and State of Massachusetts, have invented new and useful Improvements in Grass-Trimmers, of which the following is a specification.

This invention relates to grass cutting devices and the principal object of the invention is to provide means for cutting the grass in places where it is difficult to operate the usual type of lawn mower.

The purpose of the invention is to provide a device of this nature which may be operated by hand at any desired speed and it may be easily moved along the ground in cutting position while the cutters are being operated, and which is provided with adjustable features so that it can be made to conform to the conditions in which it is being used.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the device.

Fig. 2 is a front view.

Fig. 3 is a longitudinal section.

Fig. 4 is a cross section on line 4—4 of Fig. 2.

Fig. 5 is a detail view.

In these views 1 indicates a frame of stirrup shape in which the cutter shaft 2 is journaled. This shaft has limited longitudinal movement in the frame. The said shaft is held in its lowest position by means of the spring 3 bearing against a collar 4 on the shaft and against the upper end of the frame. The lower end of the shaft carries the cutter blades 5 and these blades coöperate with the cutter bar 6 which is of slightly curved formation and is formed from one-half of the lower end of the frame.

The handle 7 carries an arm 8 at its lower end which is provided with an offset portion and this offset portion is adjustably secured to one side of the frame, at the upper end thereof, by the thumb bolt 9. In this way the inclination of the handle with respect to the frame may be adjusted. The shaft 10 is mounted in a bracket 11 carried by the handle and the lower end of the shaft is connected with the upper end of shaft 2 by the universal joint 12. The upper end of the shaft 10 is provided with a gear 13 which meshes with a large gear 14 journaled in the bracket and which is provided with a handle 15.

A roller 16 is carried by a frame 17 which is connected with the handle by the bolt 18. This frame is so arranged that the roller when resting upon the ground will hold the stirrup frame slightly above the same and thus prevent the knives from engaging the ground. A U-shaped guard member 19 is connected with the bottom part of the stirrup frame with its end secured to the side members of said stirrup frame. This guard member carries a projection 20 at one side which acts as a shield for plants, bushes and other objects.

It will thus be seen that the device may be moved along the ground and the cutters operated by grasping the handle with one hand and turning the crank with the other. The handle is made long enough so that a person may operate the device without stooping. He may push the device in front of him as he walks along and the device may be forced under trees, bushes and the like so as to trim the grass in places where it is impossible to shove a lawn mower. The device can also be used for cutting around flower beds and in corners, along fences and around monuments in cemeteries.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a frame of stirrup-shape, the lower cross piece of the frame having a portion of one edge curved to provide a cutting edge, a vertically arranged shaft journaled in said frame and having limited longitudinal movement, a spring on the shaft for pressing the same downward, cutters on the lower end of said shaft, a handle, means for adjustably connecting the handle with the upper part of the frame at one side thereof, a shaft carried by the handle, means for rotating the same and gears connecting the shaft on the handle with the cutter shaft.

2. A device of the class described comprising a stirrup-shaped frame having a part of its lower cross piece curved to provide a cutting edge, a shaft vertically arranged in said frame, cutters connected with the lower end of the shaft, a handle adjustably mounted at the upper part of the frame, a shaft carried by the handle, gears connecting the said shaft with the cutter shaft, means for rotating the shaft on the handle, a U-shaped guard member connected with the bottom of the stirrup frame and a projection at one side of said guard member acting as a plant shield.

In testimony whereof I affix my signature.

EDWARD WIKSTROM.